(12) United States Patent
Nakai et al.

(10) Patent No.: US 8,493,592 B2
(45) Date of Patent: Jul. 23, 2013

(54) IMAGE FORMING APPARATUS WITH DISPLAY APPARATUS MOUNTED

(75) Inventors: Yasuhiro Nakai, Osaka (JP); Satoshi Machino, Osaka (JP); Osamu Ueda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1073 days.

(21) Appl. No.: 12/484,384

(22) Filed: Jun. 15, 2009

(65) Prior Publication Data
US 2009/0310186 A1 Dec. 17, 2009

(30) Foreign Application Priority Data
Jun. 16, 2008 (JP) ................... 2008-156924

(51) Int. Cl.
*G06F 3/12* (2006.01)

(52) U.S. Cl.
USPC ......... 358/1.15; 358/401; 358/527; 358/1.13; 345/1.1; 345/1.3; 345/2.2; 345/3.1; 399/81; 399/107

(58) Field of Classification Search
None
See application file for complete search history.

(56) References Cited

U.S. PATENT DOCUMENTS

| 7,798,352 B2* | 9/2010 | Naruishi et al. .......... 220/1.5 |
| 2002/0165768 A1 | 11/2002 | Haraguchi et al. |
| 2004/0156065 A1* | 8/2004 | Suzuki ............... 358/1.13 |
| 2006/0198094 A1* | 9/2006 | Kano et al. ............ 361/683 |
| 2008/0003010 A1* | 1/2008 | Isogai et al. ............ 399/81 |
| 2008/0079991 A1* | 4/2008 | Horikoshi et al. ...... 358/1.15 |

FOREIGN PATENT DOCUMENTS

| JP | 2002-55501 A | | 2/2002 |
| JP | 2002-156873 A | | 5/2002 |
| JP | 2002-329139 A | | 11/2002 |
| JP | 2003-107827 A | | 4/2003 |
| JP | 2003107827 A | * | 4/2003 |
| JP | 2005-274811 A | | 10/2005 |
| JP | 2007-17645 A | | 1/2007 |
| JP | 2007017645 A | * | 1/2007 |
| JP | 2008-11228 A | | 1/2008 |

* cited by examiner

*Primary Examiner* — Marivelisse Santiago Cordero
*Assistant Examiner* — Miya J Cato
(74) *Attorney, Agent, or Firm* — Birch, Stewart, Kolasch & Birch, LLP

(57) ABSTRACT

In an image forming apparatus serving as one embodiment, a large-format display that has a display screen visible from a rear face or a side face is disposed on at least one side face of a case of the image forming apparatus, and is formed such that the large-format display and the image forming apparatus are separable. The large-format display is provided with a pair of legs disposed so as to have a predetermined space L between the legs, and this space between the legs is formed so as to be no more than the lateral width of the image forming apparatus, and no more than the depth-wise width of the image forming apparatus.

16 Claims, 13 Drawing Sheets

FIG.7A
FIG.7B
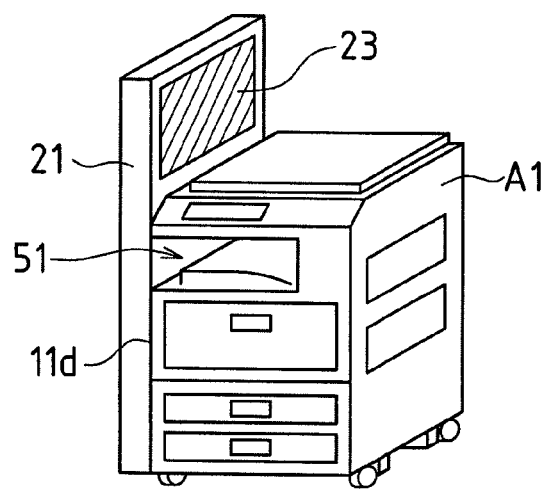
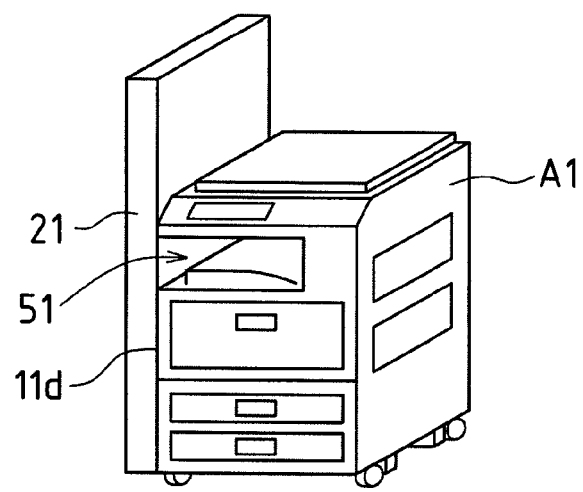

United States Patent US 8,493,592 B2

IMAGE FORMING APPARATUS WITH DISPLAY APPARATUS MOUNTED

CROSS-REFERENCE TO RELATED APPLICATION

This application claims priority under 35 U.S.C. §119(a) on Japanese Patent Application No. 2008-156924 filed in Japan on Jun. 16, 2008, the entire contents of which are herein incorporated by reference.

TECHNICAL FIELD

The present invention relates to an image forming apparatus such as a multifunction peripheral or digital copier, and more specifically relates to an image forming apparatus on which a display apparatus is mounted, in which a large-format display apparatus is integrated with the image forming apparatus.

BACKGROUND ART

Recently, image forming apparatuses such as multifunction peripherals and digital copiers are often installed in daily commodity stores or the like such as convenience stores and supermarkets, and such image forming apparatuses are mainly used, for example, when a user that uses the store takes a copy of an original.

Incidentally, in recent convenience stores, the portion of the store that faces the street and walkway is entirely encased in glass, and products are displayed such that people walking along the walkway can know the state of products inside the store at a glance. In an ordinary example of a convenience store, as shown in FIG. 14, a bookshelf 510 is placed along a glass window 501 having a large area beside an entrance 500, and an image forming apparatus A is placed along a glass window 502 having a small area beside the entrance 500. Also, an unshown register counter is disposed behind the image forming apparatus A within the store. In such an in-store arrangement, paper advertisements 505 such as posters are directly posted, facing outside of the store, to the glass windows 501 and 502, so that various publicity activity to pedestrians is carried out. Also, publicity activity to customers inside of the store is carried out by posting paper advertisements in a slight amount of open space of a display shelf within the store.

With this sort of publicity activity, it is difficult to frequently change advertisements, so there is the problem that detailed publicity activity cannot be performed depending on time spans, in which, for example, advertising targeted to businessmen is carried out during a time span in which many businessmen pass by, and advertising targeted to housewives or students is carried out during a time span in the daytime in which there are many housewives or students.

Also, the technique in which the walkway-side of the store is entirely encased in glass and advertisements are posted on that glass face is also adopted by real estate companies and the like, so that various real estate advertisements are posted all over the glass face wall and thus provided to passers-by. However, in this case as well, it is necessary for employees to manually remove information of real estate that is under a rental contract or purchase contract, and post new real estate information or the like, so there is the problem that removal, posting, or the like is frequently forgotten, and therefore the provided information may not be the newest information.

On the other hand, at present, as described above, the image forming apparatus placed in each store is mainly used by a user of the store only when taking a copy of an original, and is rarely used for other purposes. For example, Patent Documents 1 to 3 referenced below propose a way of improving the usage efficiency of such image forming apparatuses.

Patent Document 1 (JP 2002-329139A) describes an advertisement information processing system in which a wall face display and a printer are connected to each other and placed in a store, and when a print button that corresponds to advertisement information that has been displayed in the wall face display is pressed, it is possible to print the advertisement information for which that print button was pressed with the printer.

Patent Document 2 (JP 2002-156873A) describes an image processing apparatus in which an image processing apparatus that is a copy machine and a cash register are connected by a LAN, and when capturing a poster image original that has been placed on a platen of the copier, the poster image is displayed in an operation screen of the copier, and is displayed in a display apparatus of the cash register via the LAN.

Patent Document 3 (JP 2002-55501A) describes a configuration in which a power supply portion that supplies power to an image forming apparatus and a display apparatus is provided in the floor or a side face of the image forming apparatus, and by connecting both the image forming apparatus and the display apparatus to the power supply portion, it is possible to use both the display apparatus and the image forming apparatus, and even if either the image forming apparatus or the display apparatus is disconnected from the power supply portion, it is possible to use the apparatus that is connected to the power supply portion.

As described above, there have been proposals to increase advertising publicity functionality using an image forming apparatus, by connecting the image forming apparatus to a display apparatus, and printing advertising information displayed in the display apparatus with the image forming apparatus, or displaying a poster image that has been captured with the image forming apparatus in an operation screen of the image forming apparatus or on a display apparatus of a cash register.

However, with the technology described in Patent Document 1, it is necessary to install a display along the entire walkway-side wall face, and connect this display to a printer installed within the store with a communications cable, so much installation work is needed, and installation in each store is necessary, so there is the problem that installation work is very complicated. Also, there is the problem that after installation is performed once, it is not possible to easily change the layout according to circumstances.

Further, in the technology described in Patent Document 2, although advertising information can be displayed in an operation screen of an image forming apparatus or a display screen of a cash register, this is a publicity advertisement to customers inside the store, and not a publicity advertisement to people walking along the walkway in front of the store. Also, there is the problem that by only displaying advertising information on an operation screen of an image forming apparatus or a display screen of a cash register, even most customers inside the store do not notice the advertising information, and thus an adequate publicity effect is not obtained.

Also, in the technology described in Patent Document 3, there is the problem that an apparatus disconnected from a power supply unit cannot be used.

Additionally, the image forming apparatus and a large screen (for example, such as 50 inches) display apparatus connected by a cable are installed in stores, but in a store such as a convenience store or a supermarket, the question of how much selling area to secure is an issue, and because placement of two large devices in this manner results in a reduction in selling area, this approach has not been widely adopted. Also, at present, it may not be possible to secure an installation location in a small store, and so the system is not necessarily advantageous to the store.

For example, the outer dimensions of a 52-inch liquid crystal display (Sharp PN-525) are height 1254 mm, width 742 mm, and depth 92 mm, and weight 44 Kg, the outer dimensions of a liquid crystal display stand (Sharp ID-DS03W) are width 917 mm, depth 870 mm, and the outer dimensions of a digital multifunction peripheral (Sharp MX-3500FN) are height 950 mm, width 645 mm, and depth 670 mm, and weight 120 Kg. Here, when the liquid crystal display and the digital copier are placed in series, the necessary occupied floor area is the width: liquid crystal display stand width: 917 mm times the depth: 1540 mm (digital copier depth 670 mm+liquid crystal display stand depth 870 mm).

SUMMARY OF THE INVENTION

The present invention was made in order to address the problems described above, and it is an object thereof to provide an image forming apparatus on which a display apparatus is mounted, with which it is possible to obtain an adequate publicity effect to walkway pedestrians, without requiring a large installation location and with very simple installation work.

Consequently, the image forming apparatus on which a display apparatus is mounted according to the present invention is provided with an original reading portion, an image forming portion, and an operation portion, the image forming portion performing a printing operation according to operation toward the operation portion; and a display apparatus that has a display screen visible from a rear face or a side face viewed from an operation side of the image forming apparatus is disposed on at least one side face of a case of the image forming apparatus, and formed such that the display apparatus and the image forming apparatus are separable. Also, the image forming apparatus and the display apparatus can each operate individually in a state in which the image forming apparatus and the display apparatus have been separated.

With this sort of configuration, the display apparatus and the image forming apparatus can be separated, so it is possible to reduce the burden on a delivery person when bringing in or moving the apparatus. Also, because it is possible for each apparatus to operate independently even when separated, it is possible to increase the freedom of the layout of the image forming apparatus and the display apparatus. Further, there is the advantage that by separating the display apparatus and the image forming apparatus, maintenance of each apparatus is easy to perform.

Also, in the present invention, the display apparatus is provided with a support leg, and in a state in which the display apparatus and the image forming apparatus have been connected, the support leg of the display apparatus is stored under the image forming apparatus. Thus, when the display apparatus and the image forming apparatus have been connected, the support leg of the display apparatus does not protrude from the image forming apparatus, so it is possible to suppress the installation area to a minimum.

In this case, the lateral width of the support leg of the display apparatus is no more than the lateral width of the image forming apparatus, or no more than the depth-wise width of the image forming apparatus. Thus, when the display apparatus is supported by one flat support leg, when the display apparatus and the image forming apparatus have been connected, the support leg of the display apparatus does not protrude from the image forming apparatus.

Also, in the present invention, a configuration may be adopted in which a pair of support legs of the display apparatus are provided so as to have a predetermined space between the support legs, and in a state in which the display apparatus and the image forming apparatus have been connected, the support legs of the display apparatus are stored under the image forming apparatus. Thus, when the display apparatus and the image forming apparatus have been connected, the support legs of the display apparatus do not protrude from the image forming apparatus, so it is possible to suppress the installation area to a minimum.

In this case, it is preferable that the space between the support legs of the display apparatus is no more than the lateral width of the image forming apparatus, or no more than the depth-wise width of the image forming apparatus. Thus, when the display apparatus is supported with two support legs, when the display apparatus and the image forming apparatus have been connected, the support legs of the display apparatus do not protrude from the image forming apparatus.

Also, in the present invention, a configuration may be adopted in which a pair of support legs of the display apparatus are provided so as to have a predetermined space between the support legs, and in a state in which the display apparatus and the image forming apparatus have been connected, the image forming apparatus is stored between the support legs of the display apparatus. That is, when the display apparatus is disposed on the back face of the image forming apparatus, the space between the support legs of the display apparatus is no less than the lateral width of the image forming apparatus, and when the display apparatus is disposed on a side face of the image forming apparatus, the space between the support legs of the display apparatus is no less than the depth-wise width of the image forming apparatus. Thus, in a state in which the display apparatus and the image forming apparatus have been connected, the support legs of the display apparatus hold, in a sandwiching manner, the front and rear faces of the image forming apparatus, or the left and right faces of the image forming apparatus. Therefore, it is possible to stably dispose the display apparatus.

Also, in the present invention, it is possible to adopt a configuration in which by connection of the image forming apparatus and the display apparatus, power, control signals, and display data are supplied from the image forming apparatus to the display apparatus, or from the display apparatus to the image forming apparatus.

In this way, in the present invention, a configuration is adopted in which the display apparatus and the image forming apparatus can be separated, so it is possible to reduce the burden on a delivery person when bringing in or moving the apparatus. Also, because it is possible for each apparatus to operate independently even when separated, it is possible to increase the freedom of the layout of the image forming apparatus and the display apparatus. Further, there is the advantage that by separating the display apparatus and the image forming apparatus, maintenance of each apparatus is easy to perform.

BRIEF DESCRIPTION OF THE DRAWINGS

FIGS. 7A and 7B are perspective views that show a state in which the large-format display has been attached to one side face case of the image forming apparatus, with FIG. 7A showing a case where a second display screen is present, and FIG. 7B showing a case where a second display screen is not present.

BEST MODE FOR CARRYING OUT THE INVENTION

Hereinafter, embodiments of the present invention will be described with reference to the accompanying drawings.

Figure 1A:
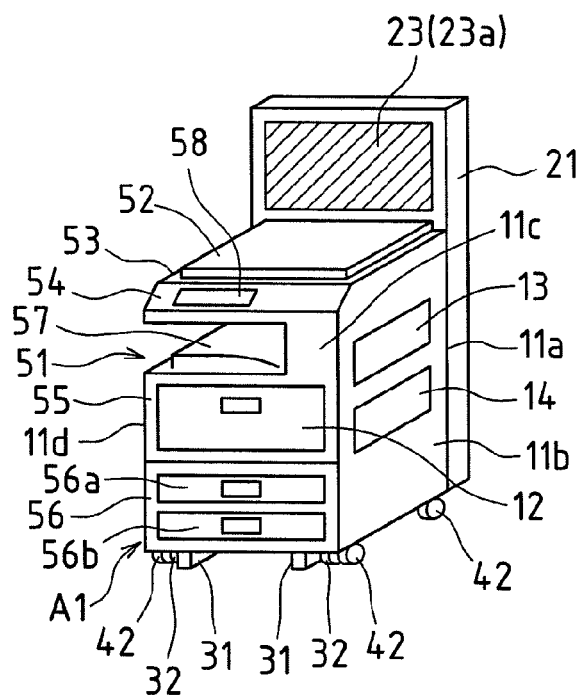
FIGS. 1A to 1C show an image forming apparatus according to one embodiment of the present invention, with FIGS. 1A and 1B being outer perspective views, and FIG. 1C being an outer perspective view when that image forming apparatus is viewed from the back face side.
Figure 1B:
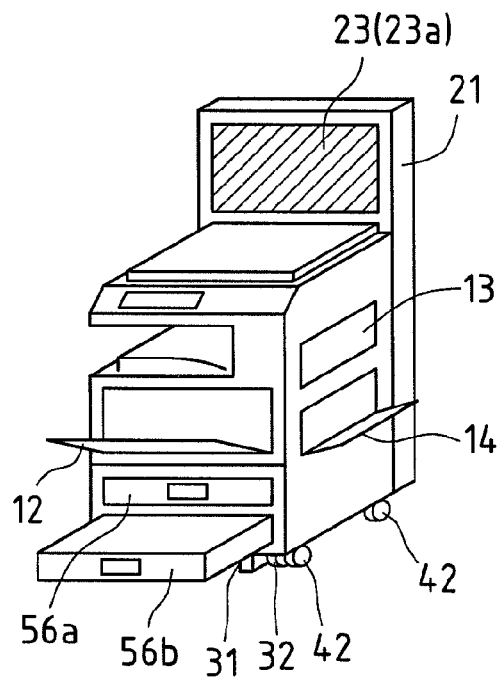
Figure 1C:
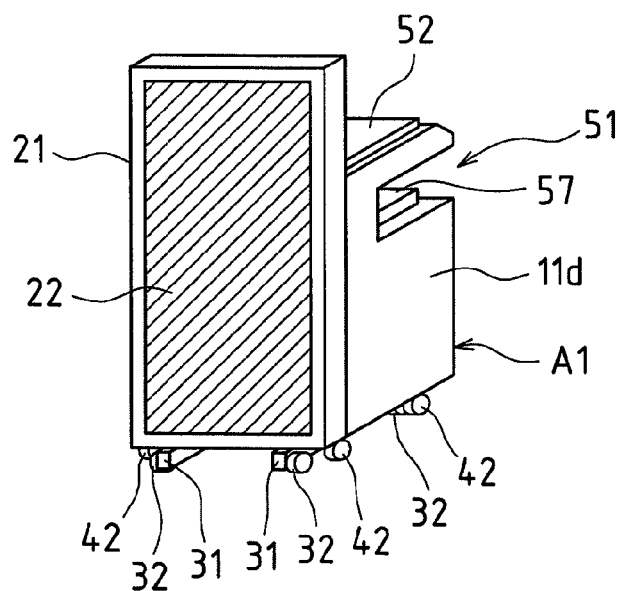

FIGS. 1A to 1C are outer perspective views of an image forming apparatus A1 on which a display apparatus is mounted, according to an example of the present invention.

The image forming apparatus A1 is an image forming apparatus with an in-body paper discharge structure formed in a sideways U shape when viewed from the front. In the image forming apparatus A1, an original pressing lid 52, an original reading portion 53, and a scanner portion 54 are disposed above an in-body paper discharge opening portion 51, and an image forming portion 55 and a paper supply portion 56 are disposed below the in-body paper discharge opening portion 51. Also, a keyboard-type and touch panel-type operation portion 58 is disposed on the front face of the original reading portion 53.

That is, the image forming apparatus A1 is surrounded by a back face case 11a and a right side face case 11b formed in a rectangular shape, an approximately rectangular front face case 11c where the in-body paper discharge opening portion 51 is notched in a sideways U shape, and a left side face case 11d, and the top of these case portions is covered by the scanner portion 54, which includes the original pressing lid 52 and the original reading portion 53. Also, casters 42 are provided at each case bottom corner, so that the image forming apparatus A1 can be freely moved by pushing.

The image forming apparatus A1 is a front access-type image forming apparatus in which, when an original is placed in the original reading portion 53, when recording paper is drawn from a discharge tray 57 of the in-body paper discharge opening portion 51, and when recording paper is replenished in the paper supply portion 56, these activities can be performed from the front face of the image forming apparatus A1. Also, a front door 12 is provided immediately below the in-body paper discharge opening portion 51 of the front face case 11c, side doors 13 and 14 are provided at two locations above and below in the right side face case 11b, and respective paper cassettes 56a and 56b of the paper supply portion 56 are disposed so as to be capable of being pulled out to the front, below the front door 12. By opening the front door 12, it is possible to perform maintenance such as toner replenishment, exchanging of a photosensitive body, and repair or exchange of a fixing unit or a charging unit. Also, when removing jammed recording paper from a paper transport path, the side doors 13 and 14 are opened as necessary. However, other than disposing the discharge tray 57 in the in-body paper discharge opening portion 51, the configuration of constituent portions disposed above and below the in-body paper discharge opening portion 51 is an example, and is not limited to this arrangement configuration.

In the above configuration, in this example, a large-format display apparatus (display) 21, arranged so that the lengthwise direction of its screen is oriented vertically, is attached as a single body to the back face case 11a, with a first display screen 22 facing to the outside. The back face case 11a is a case of the rear face side of the image forming apparatus A1 when viewed from the operation side (that is, a case of the rear face side when viewed from the front side of the original reading portion 53 where the operation portion 58 is provided). Thus, it is possible to fit two large devices, namely the image forming apparatus A1 and the large-format display 21, substantially within the installation space of the image forming apparatus A1. Also, because a connection cord between the image forming apparatus A1 and the large-format display 21 is not exposed to the outside, appearance is neat, and there is no problem of the connection cord being pulled. Thus, even in a small store such as a convenience store or a supermarket, installation of the image forming apparatus A1 is possible in about the same location and same manner as a conventionally installed image forming apparatus.

Also, the large-format display 21 is disposed such that the top of the large-format display 21 protrudes above the back face case 11a, and a second display screen 23 is disposed on a face of that protruding portion that is opposite to the first display screen 22. A touchpanel 23a used as an operation input portion may also be disposed on the second display screen 23. Although not absolutely necessary, it is better to provide the second display screen 23, in consideration of convenience of the user. In the above example, the first display screen 22 and the second display screen 23 of the large-format display 21 are provided as a single body, but they may also be separate.

Figure 2:
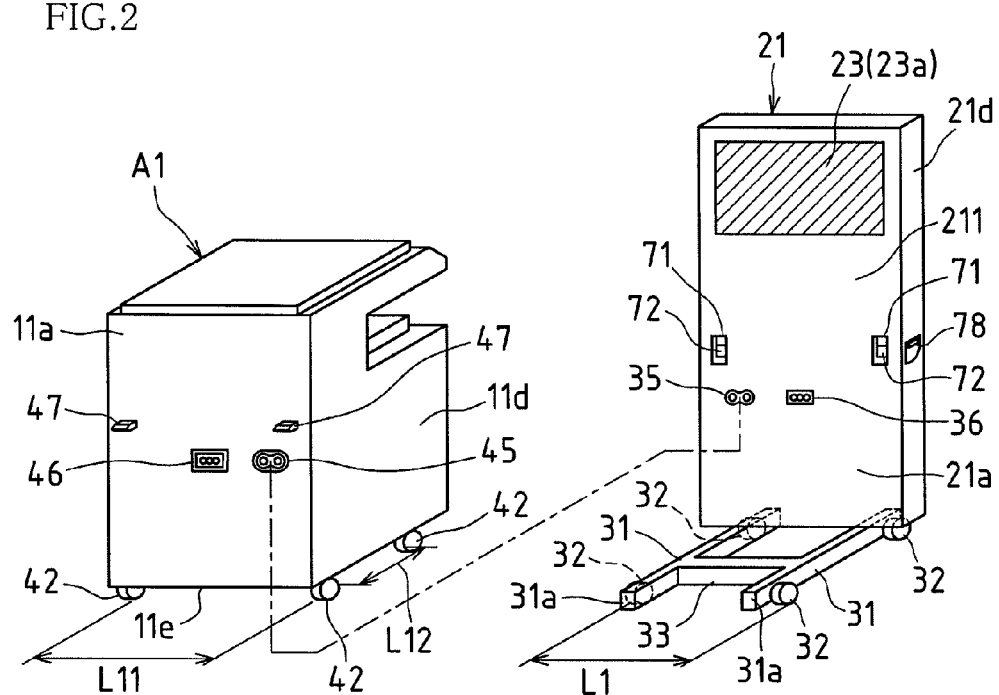
FIG. 2 is an outer perspective view that shows a state in which a large-format display and the image forming apparatus are separated.
Figure 3:
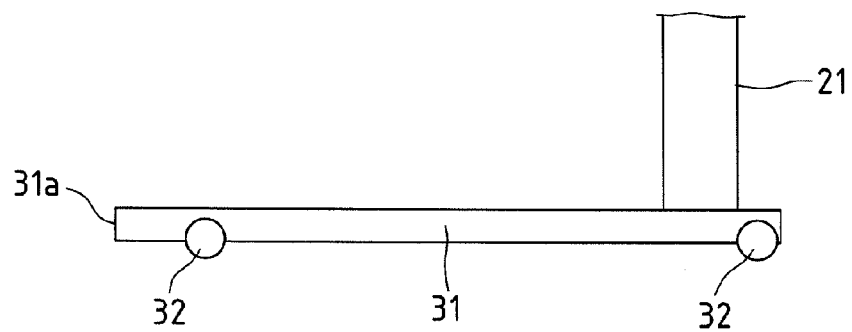
FIG. 3 is a side face view of a leg of the large-format display.
Figure 4:
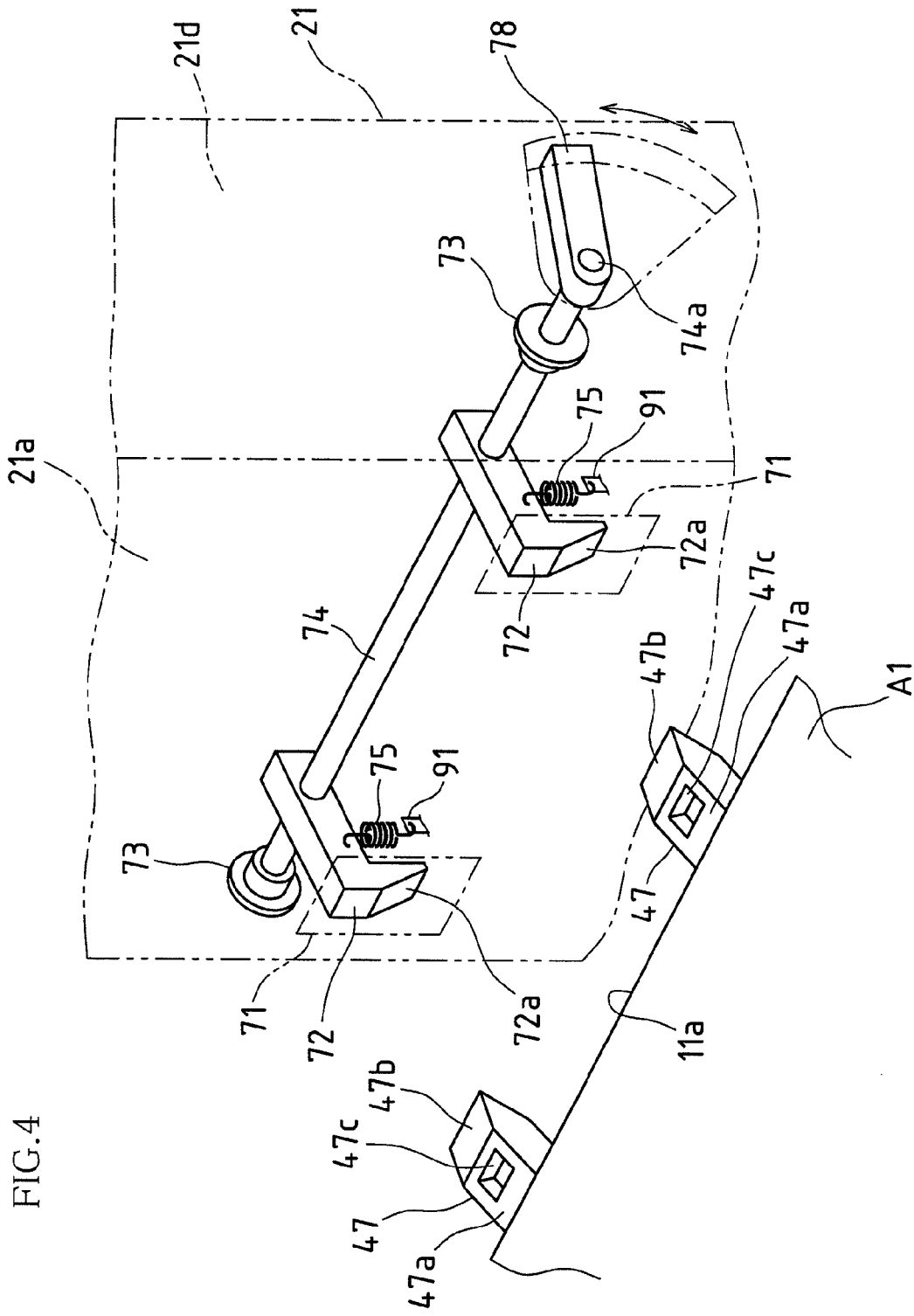
FIG. 4 is a schematic perspective view that shows a connecting structure of the image forming apparatus and the large-format display by a fixing member and a fixing catch.
Figure 5B:
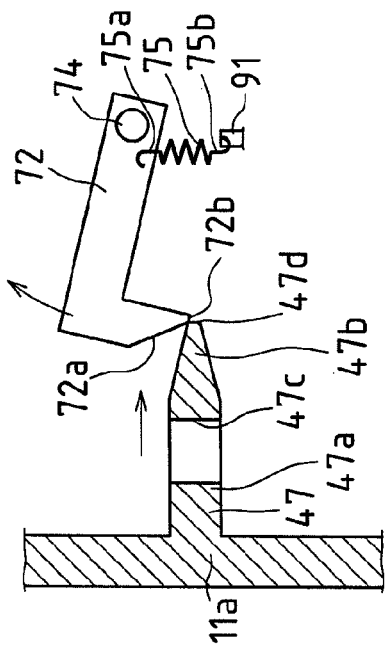
FIGS. 5A to 5D illustrate transition states of connection of the fixing member and the fixing catch.
Figure 5D:
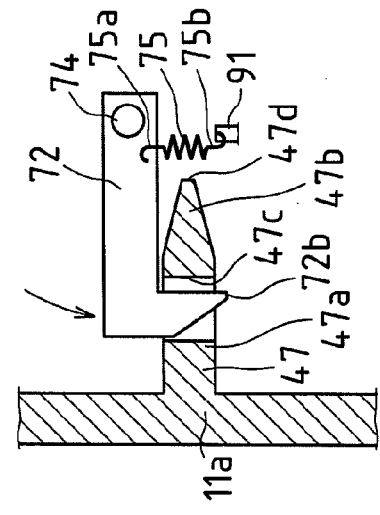
Figure 5A:
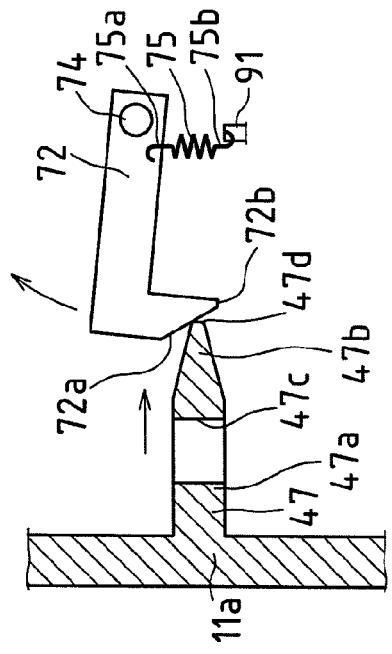
Figure 5C:
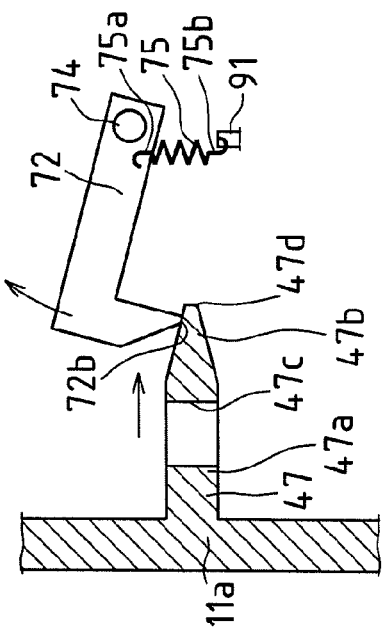

FIG. 2 shows a state in which, in the image forming apparatus A1 on which the large-format display 21 has been mounted with the above configuration, the large-format display 21 and the image forming apparatus A1 are separated. FIG. 3 is a side view of the large-format display 21.

The large-format display 21 is mounted and fixed on a left-right pair of legs 31 that support a display body 211, and casters 32 are provided at the front and rear of each leg 31. The display body 211 is mounted and fixed near one end of the pair of legs 31, but as shown in FIG. 3, in consideration of stability, the display body 211 is mounted and fixed at least to the inside of the casters 32 (that is, between the front-rear casters 32). Also, the left-right pair of legs 31, in order to insure strength, are linked as a single body by a crosspiece 33 in the center portion in the lengthwise direction, thus being formed in an H-shape as a whole.

Also, two of the casters 42 are provided in the front-rear direction, at the left and right edges of a bottom face case 11e of the image forming apparatus A1 (i.e., a total of four casters). The pair of legs 31 of the display body 211 are stored in the space below the image forming apparatus A1 supported by these four casters 42 (stored in the space between the bottom face case 11e and the floor), and the legs 31 are set to a length such that end portions 31a of the legs 31 do not protrude from the front face or the side face of the image forming apparatus A1.

That is, as shown in FIGS. 1A to 1C, the large-format display 21 may be disposed on the back face side of the image forming apparatus A1, or as shown in FIGS. 7A and 7B, may be disposed on one side face, viewed from an operation side of the image forming apparatus A1 (i.e., viewed from the front face side of the image capturing portion 53 where the operation portion 58 is provided). Accordingly, the length is set such that when the large-format display 21 has been disposed on the back face case 11a of the image forming apparatus A1, then end portions 31a of the legs 31 do not protrude from the front face 11c of the image forming apparatus A1. Also, the length is set such that when the large-format display 21 has been disposed on one side face (the left side face case 11d in FIGS. 7A and 7B) of the image forming apparatus A1, the end portions 31a of the legs 31 do not protrude from the other side face (the right side face case 11b) of the image forming apparatus A1.

Also, a space L1 (precisely, a space between the outside of the left-right casters 32) of the legs 31 is set to no more than the lateral width of the image forming apparatus A1 (precisely, no more than a gap width L11 between the left-right casters 42), and no more than the depth-wise width of the image forming apparatus A1 (precisely, no more than a gap width L12 between the front-rear casters 42). However, if the casters 32 are provided not on the outside face but on the inside face of the legs 31, the space L1 between the legs 31 is, precisely, the space between the outside faces of the legs 31. Thus, when the large-format display 21 and the image forming apparatus A1 are connected, the legs 31 of the large-format display 21 are smoothly stored in the space below the image forming apparatus A1 (the space between the bottom face case 11e and the floor), and the end portions 31a of the legs 31 do not protrude from the image forming apparatus A1.

Also, a power connector portion 35 that receives power supply from the image forming apparatus A1 side and a signal connector portion 36 that receives signals for display control and the like from the image forming apparatus A1 side are provided in the back face case 21a, which is on the side of the second display screen 23 of the large-format display 21.

On the other hand, a power connector portion 45 that supplies power to the large-format display 21 and a signal connector portion 46 that sends signals for display control and the like to the large-format display 21 are provided in the back face case 11a of the image forming apparatus A1, and when the image forming apparatus A1 and the large-format display 21 are connected, the power connector portion 45 and the signal connector portion 46 of the image forming apparatus A1 are respectively connected to the power connector portion 35 and the signal connector portion 36 of the large-format display 21. Power is supplied to the image forming apparatus A1 by a commercial power supply via a power cord that is not shown.

In this example, power and so forth is supplied from the image forming apparatus A1 to the large-format display 21, but power and so forth may conversely be supplied from the large-format display 21 to the image forming apparatus A1. Also, in this example, in a state in which the image forming apparatus A1 and the large-format display 21 are separated as shown in FIG. 2, the image forming apparatus A1 and the large-format display 21 can each operate individually. More specifically, the image forming apparatus A1 is capable of normal operation, i.e. copying or faxing, and the large-format display 21 is capable normal operation as a monitor. In this case, the image forming apparatus A1 can operate independently due to receiving power supply from an unshown power cord, and the large-format display 21 is made capable of operation by attaching a separate unshown connector to the power connector portion 35.

Also, a pair of left-right fixing members 47 for fixing the large-format display 21 are formed protruding from the back face case 11a of the image forming apparatus A1, and opening portions 71 where the respective fixing members 47 are inserted and latched are provided in the opposing back face case 21a of the large-format display 21. Fixing catches 72 for latching by insertion into the fixing members 47 of the large-format display 21 are provided in the opening portions 71.

FIG. 4 and FIGS. 5A to 5D show the connection structure of the image forming apparatus A1 and the large-format display 21 by the fixing members 47 and the fixing catches 72. Below, the connection structure will be described with reference to FIG. 4 and FIGS. 6A to 5D.

Each fixing member 47 is provided with a flat body portion 47a that protrudes from the back face case 11a of the image forming apparatus A1, and a wedge-shaped tapered portion 47b is formed at the end of the body portion 47a. Also, in the base portion of the body portion 47a, a through-hole 47c for inserting and latching the fixing catch 72 is formed in a shape passing through in the vertical direction.

On the other hand, the fixing catch 72 disposed facing the opening portion 71 of a back face case 21a of the large-format display 21 is fixed to a shaft 74 that is rotatably supported by a bearing portion 73 disposed in an unshown frame portion of the large-format display 21. One end 75a of a compression spring 75 is fixed to the fixing catch 72, and an other end 75b of the compression spring 75 is fixed to a spring receptacle 91 provided in the frame portion of the large-format display 21. In the fixing catch 72, in the horizontal state shown in FIG. 4 the compression spring 75 is in a completely compressed state, and that horizontal state is held by the compression spring 75. When the fixing catch 72 rotates upward from this state, the compressive force (compressive restorative force) of the compression spring 75 that has been extended by that rotation acts on the fixing catch 72, and thus the fixing catch 72 is biased to the frame portion side (i.e., the lower side in FIG. 4).

Also, one end of the shaft 74 protrudes outward from a left side face case 21*d* of the large-format display 21, and a release lever 78 for rotating the shaft 74 together with the fixing catch 72 is provided at an end portion 74*a* of this protruding shaft 74.

In the above configuration, in order to connect the large-format display 21 to the image forming apparatus A1, the back face case 11*a* of the image forming apparatus A1 and the back face case 21*a* of the large-format display 21 are faced towards each other, and then the large-format display 21 is moved to the image forming apparatus A1 side. When doing so, the fixing member 47 protruding from the back face case 11*a* of the image forming apparatus A1 is introduced from the opening portion 71 of the large-format display 21 into the large-format display 21, and contacts an opposing face 72*a* of the fixing catch 72 that is disposed facing (see FIG. 5A). Here, the opposing face 72*a* of the fixing catch 72 is formed as a tapered face. Therefore, the fixing catch 72 slides and rotates upwards such that the opposing face (tapered face) 72*a* is pushed upward by an end face 47*d* of the fixing member 47 that has entered (see FIG. 5B).

When a catch tip 72*b* of the fixing catch 72 passes over the end face 47*d* of the fixing member 47, the catch tip 72*b* additionally slides on the tapered portion 47*b* of the fixing member 47 and rotates upward (see FIG. 5C), and then slides on the body portion 47*a* of the fixing member 47.

When the catch tip 72*b* of the fixing catch 72 reaches the through-hole 47*c* of the fixing member 47, the fixing catch 72 rotates downward due to contractive force of the extended compression spring 75, so that the fixing catch 72 is inserted into the through-hole 47*c* and thus latched. Thus, the large-format display 21 and the image forming apparatus A1 are connected.

At this time, the power connector portions 35 and 45 and the signal connector portions 36 and 46 of the large-format display 21 and the image forming apparatus A1 are also simulataneously connected to each other. Also, the legs 31 of the large-format display 21 are stored in the space below the image forming apparatus A1 (stored in the space between the bottom face case 11*e* and the floor).

On the other hand, when releasing the connection between the large-format display 21 and the image forming apparatus A1 that have been thus made into a single body, the release lever 78 disposed in the left side face case 21*d* of the large-format display 21 is rotated downward. Due to downward rotation of the release lever 78, the fixing catch 72 rotates upward around the shaft 74 against the compressive force of the compression spring 75, and the connection is released by the fixing catch 72 evacuating upward from the through-hole 47*c* of the fixing member 47, so by pulling the large-format display 21 away from the image forming apparatus A1 in this released state, it is possible to separate the large-format display 21 and the image forming apparatus A1.

Figure 6A:
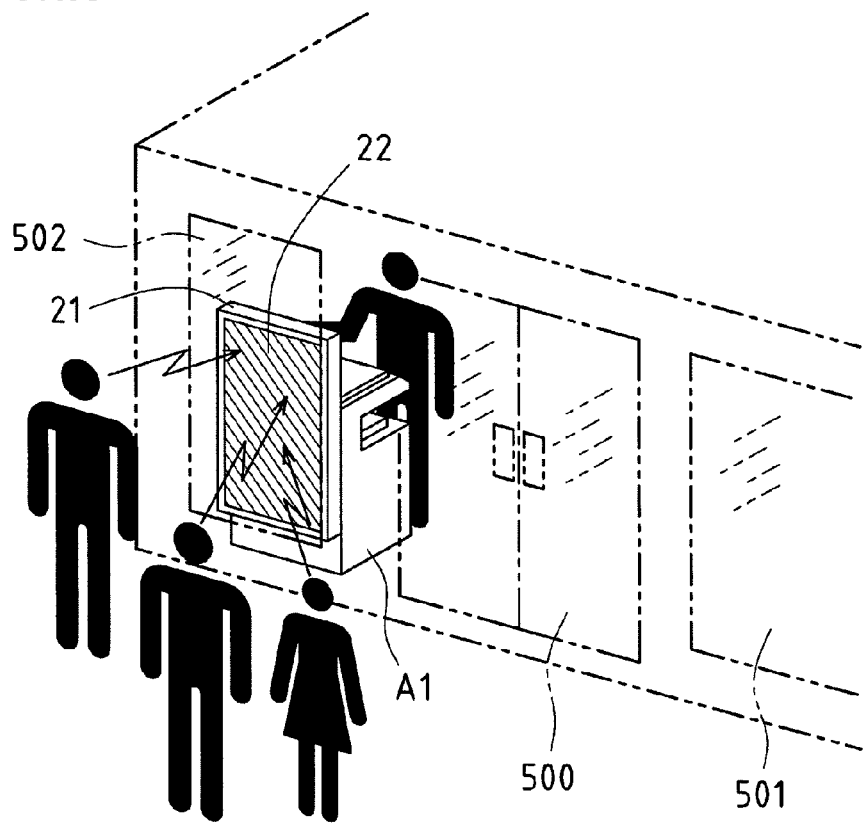
FIGS. 6A and 6B show an example of a state in which the image forming apparatus on which the large-format display has been mounted according to this embodiment has been installed in a convenience store, with FIG. 6A being a perspective view and FIG. 6B being a plan view.
Figure 6B:
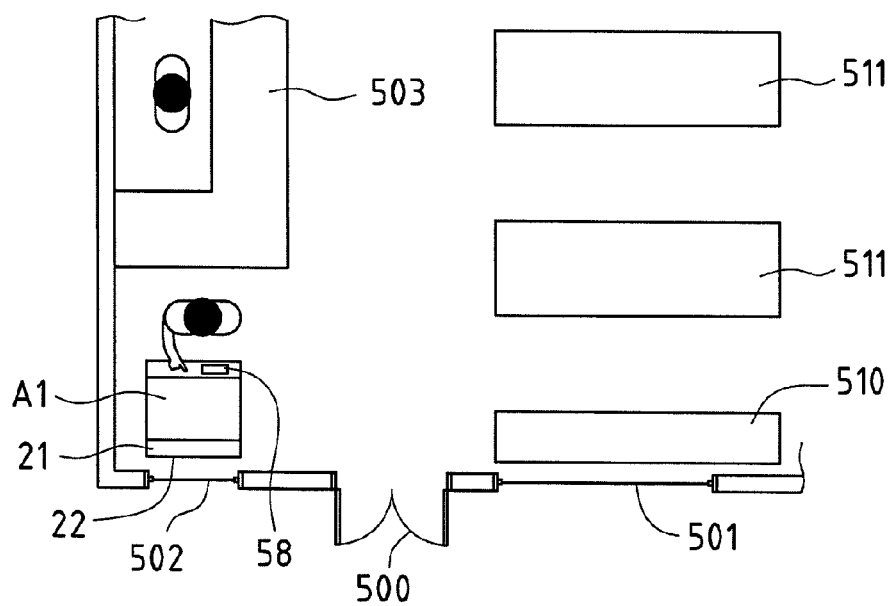

FIGS. 6A and 6B show an example of a state in which an image forming apparatus on which a display apparatus has been mounted with the above configuration has been installed in a convenience store, with FIG. 6A being a perspective view and FIG. 6B being a plan view.

That is, in recent convenience stores, the portion of the store that faces the street and walkway is entirely encased in glass by a transparent glass window, and products are displayed such that people walking along the walkway can know the state of products inside the store at a glance. Specifically, in an ordinary arrangement pattern, a wide space-side glass window 501 and a narrow space side glass window 502 are provided with an entrance 500 between them, a bookshelf 510 is placed along the wide space-side glass window 501, an image forming apparatus A is placed along the narrow space-side glass window 502, a register counter 503 is disposed behind the image forming apparatus A1 within the store, and miscellaneous products shelves 511 are disposed behind the bookshelf 510 within the store.

In this case, the image forming apparatus A1 is disposed so that the first display screen 22 of the large-format display 21 attached to the back face faces outside (i.e., the walkway outside of the store). Thus, the first display screen 22 of the large-format display 21 faces pedestrians outside of the store through the street-side (i.e., the walkway-side) glass window 502. Accordingly, by displaying advertising information on the first display screen 22 of the large-format display 21, it is possible to display publicity advertisements with impact to pedestrians outside of the store.

In this case, the second display screen 23 may display the same information as the advertising information displayed in the first display screen 22 installed facing the walkway, or may display information (such as detailed information) related to the advertising information displayed in the first display screen 22. Thus, when a pedestrian interested in the advertising content of the first display screen 22 enters the store and comes in front of the image forming apparatus A1, detailed information of the advertising content is displayed in the second display screen 23, so by operating a touch panel of the second display screen 23 or the operation portion 58 of the image forming apparatus A1, it is possible to perform printing or the like of desired information.

For example, it is possible that information that a coupon will be issued is displayed in the first display screen 22, and when a customer who has seen this information enters the store and operates (touches) a coupon issue button displayed in the detailed information displayed in the second display screen 23, the image forming apparatus A1 outputs a coupon by printing.

Also, in the example described above, the large-format display 21 is attached to the back face of the image forming apparatus A1, but as long as there is no obstruction to original reading, taking paper from a discharge tray, replenishing recording paper in a paper cassette, opening/closing doors for maintenance or the like, the large-format display 21 may, for example, be attached to the one side face case 11*d* of the image forming apparatus A1, as shown in FIGS. 7A and 7B. FIG. 7A shows an example with the second display screen 23, and FIG. 7B shows an example without the second display screen 23.

Figure 8:
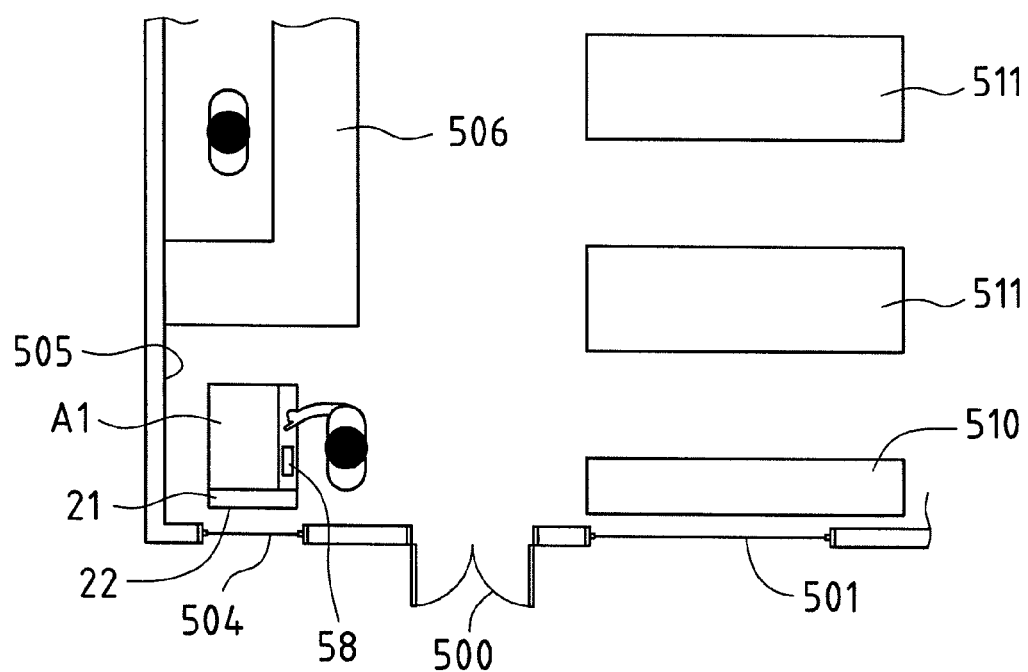
FIG. 8 is a plan view that shows an example of a state in which the image forming apparatus with the large-format display attached to the side face case has been installed in a convenience store.

FIG. 8 shows an example of a state in which the image forming apparatus A1 shown in FIGS. 6A and 6B has been installed in a convenience store. In this example, the image forming apparatus A1 is placed along a glass window 504 having a small area beside the entrance 500, in a horizontal orientation relative to the glass window 504 such that the first display screen 22 of the large-format display 21 attached to the side face faces the outside (i.e., the walkway outside of the store). That is, the image forming apparatus A1 is installed such that the back face of the image forming apparatus A1 faces a wall 505. This is an effective mode of installation when it is not possible to secure an adequate user operation space for the image forming apparatus A1 between the glass window 504 and a register counter 506, and this mode of installation is made possible by attaching the large-format display 21 to a side face of the image forming apparatus A1.

Other Example of Legs Provided in Large-Format Display 21

Figure 9:
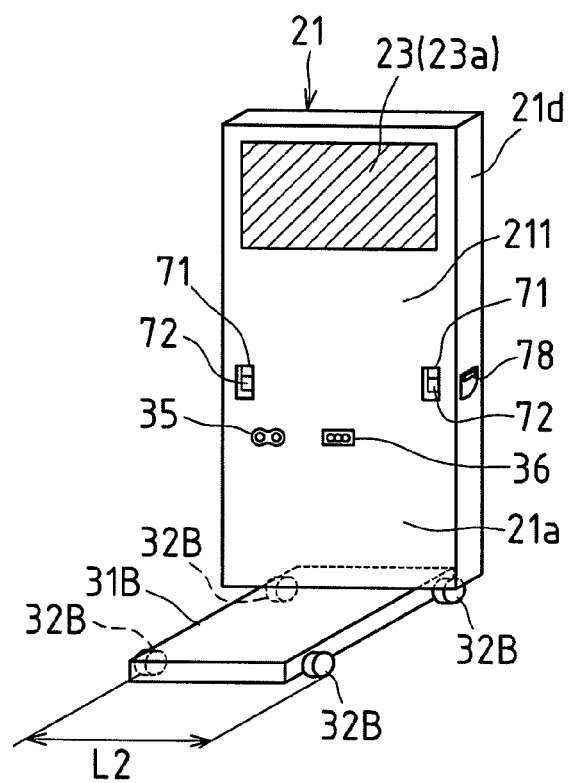
FIG. 9 is a perspective view of a large-format display that shows another example of a leg.

FIG. 9 shows another example of legs.

The large-format display 21 is placed and fixed on one flat leg 31B that supports the display body 211, and casters 32B are provided at the front and rear of the leg 31B on both the left and right sides. Also, a lateral width L2 (precisely, a space between the outside of the left-right casters 32B) of the leg 31B is set to no more than the lateral width of the image forming apparatus A1 (precisely, no more than the gap width L11 between the left-right casters 42 shown in FIG. 2), and no more than the depth-wise width of the image forming apparatus A1 (precisely, no more than the gap width L12 between the front-rear casters 42 shown in FIG. 2). However, if the casters 32B are provided not on the left and right sides of the leg 31B, but disposed in openings provided at four locations near the left and right sides of the leg 31B, the lateral width L2 becomes the lateral width of the leg 31B itself. Thus, when the large-format display 21 and the image forming apparatus A1 are connected, the leg 31B of the large-format display 21 is smoothly stored in the space below the image forming apparatus A1 (the space between the bottom face case 11e and the floor). Other aspects of this configuration are the same as the configuration of the legs 31 shown in FIGS. 2 and 3, so a description thereof is omitted here.

Still Another Example of Legs Provided in Large-Format Display 21

In the above examples, the legs 31 and the leg 31B of the large-format display 21 are stored below the image forming apparatus A1, but in the present example, the image forming apparatus A1 is disposed between legs of the large-format display 21.

Figure 10A:
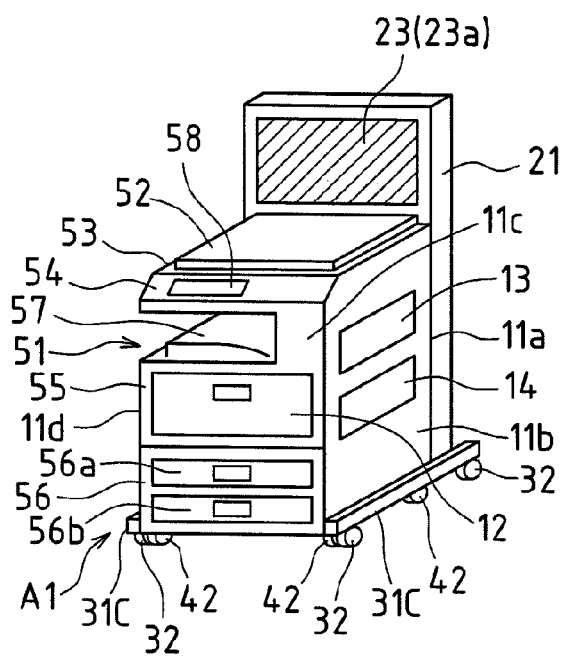
FIGS. 10A to 10C show an image forming apparatus according to another example of the present invention, with FIGS. 10A and 10B being outer perspective views of an image forming apparatus on which a large-format display having legs has been mounted, and FIG. 10C being an outer perspective view when that image forming apparatus is viewed from the back face side.
Figure 10B:
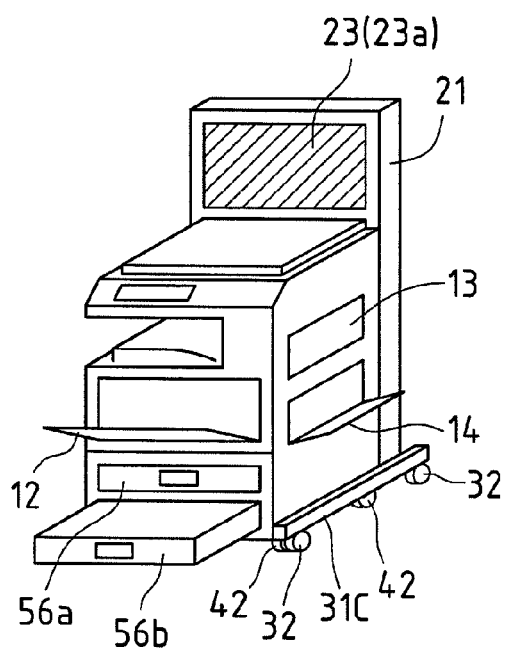
Figure 10C:
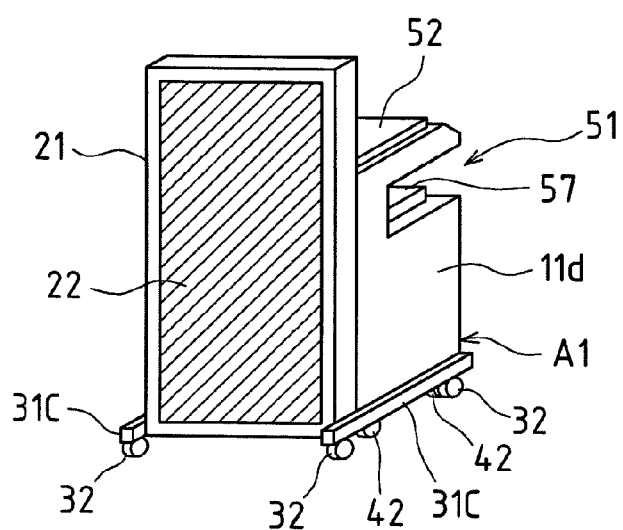
Figure 11:
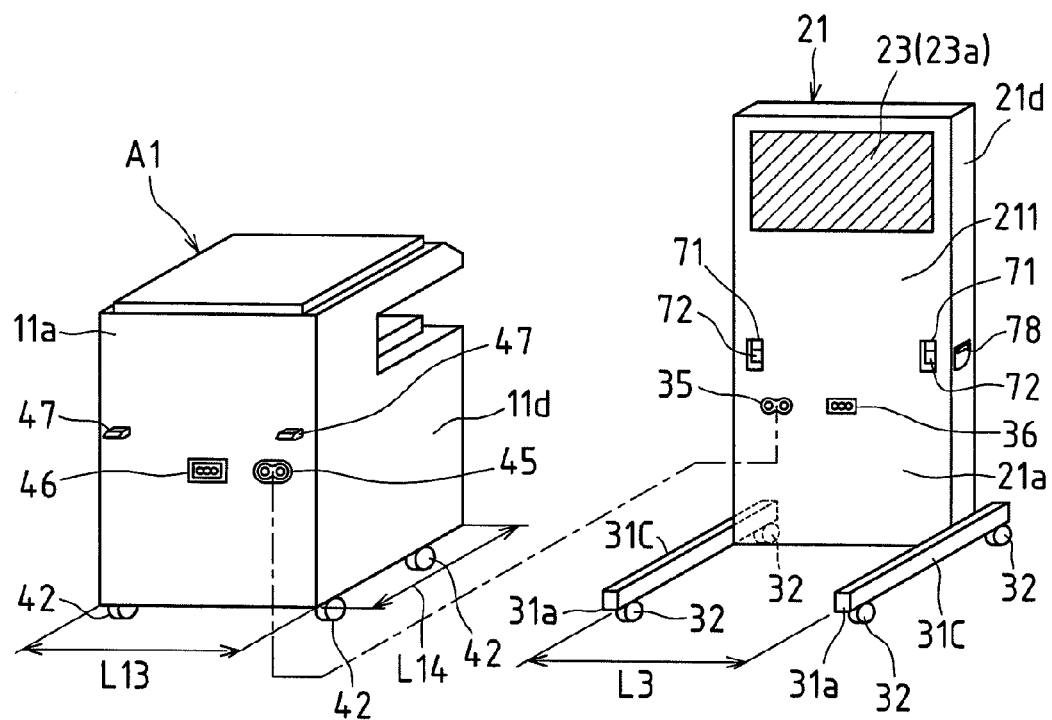
FIG. 11 is an outer perspective view that shows a state in which the large-format display and the image forming apparatus are separated.

FIGS. 10A to 10C are outer perspective views of an image forming apparatus A1 on which a large-format display 21 having legs according to this example has been mounted, and FIG. 11 is an illustrative view (outer perspective view) that shows a state in which the large-format display 21 and the image forming apparatus A1 are separated.

In this example, in the large-format display 21, a left-right pair of legs 31C that support the display body 211 are fixed to the lower end left and right sides of the display body 211, and casters 32 are provided at the front and rear of each leg 31C. Also, a gap width (space) L3 between the legs 31C is set to no less than a lateral width L13 of the image forming apparatus A1, and no less than a depth-wise width L14 of the image forming apparatus A1. Thus, when the large-format display 21 and the image forming apparatus A1 are connected, the large-format display 21 is smoothly stored between the legs 31C of the large-format display 21.

When the image forming apparatus A1 is not currently disposed between the legs 31C of the large-format display 21, the configuration is the same as in FIGS. 2 to 5, which show the connection structure of the image forming apparatus A1 and the large-format display 21, and FIG. 7, which shows other aspects of the arrangement relationship of the image forming apparatus A1 and the large-format display 21, so a description thereof is omitted here.

System Configuration of Image Forming Apparatus A1 With Large-Format Display 21 Mounted According to Present Example In the present example, the image forming apparatus A1 is applied to a digital multifunction peripheral.

Figure 12:
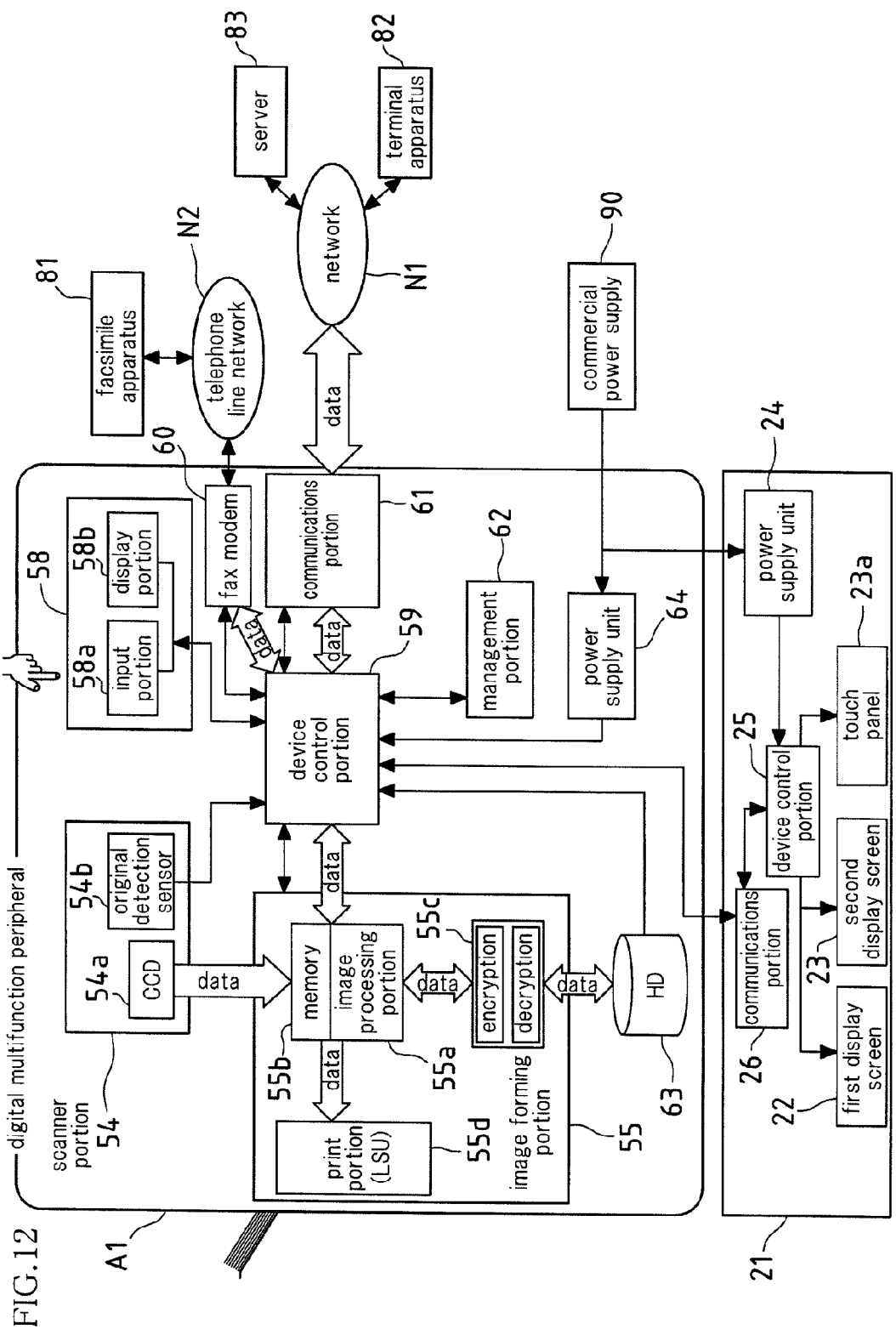
FIG. 12 is a system configuration diagram that shows the general electrical configuration of a digital multifunction peripheral (image forming apparatus) that includes a large-format display, and the connection relationship with a display information management system that manages this general electrical configuration.

FIG. 12 shows the general electrical configuration of a digital multifunction peripheral (image forming apparatus) A1 that includes a large-format display 21, and the connection relationship with a display information management system that manages this general electrical configuration.

First will be a description of the electrical configuration of this digital multifunction peripheral A1.

As shown in FIG. 12, the digital multifunction peripheral A1 is provided with a scanner portion 54, an operation portion 58, an image forming portion 55, a device control portion 59, a fax modem 60, a communications portion 61, a management portion 62, a hard disk (HD) 63, and a power supply unit 64. That is, the digital copier A1 of this example is a multi-function peripheral having a fax machine and a network printer.

The scanner portion 54 is provided with a CCD 54a, an original detection sensor 54b, and the like.

The operation portion 58 is provided with an input portion 58a configured with a touch panel and various function buttons that are mechanical keys, and the like, and a display portion 58b that is configured with a display panel of liquid crystal or the like.

The image forming portion 55 is provided with an image processing portion 55a that has a work memory 55b where print data is decompressed; an encryption/decryption portion 55c that encrypts data transmitted from outside in order to protect that data in a device, and temporarily saves (stores) that encrypted data to the hard disk 63, and also decrypts the data saved to the hard disk 63 and transfers the decrypted data to the image processing portion 55a; a print portion 55d that has a laser scanning unit (LSU); and the like. Here, the print portion 55d is not limited to employing an electrophotographic system, and is applicable in various forms, such as an inkjet system or a heat transfer system.

The device control portion 59 manages operational control of devices as a whole, and is configured with a CPU, a ROM, a RAM, and the like. As display control, other than display control of the display portion 58b, the device control portion 59 also performs display control of the first display screen 22 and the second display screen 23 of the large-format display 21.

The management portion 62 manages information necessary for device operation, and for example, with respect to sending and receiving, performs management of mail addresses and fax telephone numbers, and the like. Also, the management portion 62 performs overall management of information necessary for device operation such as management of location information (address information) of data temporarily saved to the hard disk 63, management of location information of data output to the printer when operating in printer mode, and the like.

Also, in this example, the management portion 62 manages the order, time, and the like for displaying various display data stored to the hard disk 63 in the first display screen 22 and the second display screen 23 of the large-format display 21.

The communications portion 61 performs bidirectional communications with a network N1, and in this example, is a printer board provided with a memory for decompressing received data into data that can be handled by a device. Accordingly, with the communications portion 61, received data is, while decompressed in this memory, sequentially transferred to the work memory 55b.

In the digital multifunction peripheral A1 with the above configuration, it is possible to connect a facsimile apparatus 81 via a telephone line N2 to the fax modem 60. Also, a terminal apparatus (personal computer) 82, a server 83, and the like can be connected to the communications portion 61 via the network N1, which is a LAN or the like.

It is also possible to store data (moving images, still images, text, or the like) that has been forwarded to the digital multifunction peripheral A1 via the network N1 from the terminal apparatus 82, the server 83, or the like to the hard disk 63, and display this data on the first display screen 22 and the second display screen 23 of the large-format display 21 based on the management information stored in the management portion 62.

It is also possible to have the server 83 manage the various information displayed on the first display screen 22 and the second display screen 23 of the large-format display 21, the display order, the display time, and the like, instead of the management portion 62.

Electrical power from a commercial power supply 90 is supplied to the power supply unit 64 of the image forming apparatus A1 via an unshown power cord provided in the image forming apparatus A1, and thus power is supplied from the power supply unit 64 to each part of the image forming apparatus A1. The power line where power is supplied from the commercial power supply 90 to the power supply unit 64 of the image forming apparatus A1 is branched at some point so that power is directly supplied to the power supply unit 24 of the large-format display 21, and power is supplied from the power supply unit 24 to each part of the large-format display 21.

In this case, sending/receiving of signals is performed between the device control portion 59 of the image forming apparatus A1 and the communications portion 26 of the large-format display 21. That is, data that has been transmitted from the terminal apparatus 82 or the server 83 connected to the network N1 is transmitted to the device control portion 59 via the communications portion 61, and transmitted from the device control portion 59 to the device control portion 25 via the communications portion 26 of the large-format display 21. The device control portion 25 performs image display of the data that has been transmitted in the first display screen 22 and the second display screen 23.

In the above description, a configuration is adopted in which power and display data are supplied from the image forming apparatus A1 to the large-format display 21, but power and print data may be supplied from the large-format display 21 to the image forming apparatus A1. In this case, power from the commercial power supply 90 is supplied to the power supply unit 24 of the large-format display 21 by an unshown power cord provided in the large-format display 21, and power is supplied to each part of the large-format display 21 from the power supply unit 24. The power line where power is supplied from the commercial power supply 90 to the power supply unit 24 of the large-format display 21 is branched at some point so that power is directly supplied to the power supply unit 64 of the image forming apparatus A1, and power is supplied from the power supply unit 64 to each part of the image forming apparatus A1.

In this case, sending/receiving of signals is performed between the device control portion 25 of the large-format display 21 and the communications portion 61 of the image forming apparatus A1. That is, data that has been transmitted from the terminal apparatus 82 or the server 83 connected to the network N1 is transmitted to the device control portion 25 via the communications portion 26 of the large-format display 21, and transmitted from the device control portion 25 to the device control portion 59 via the communications portion 61 of the image forming apparatus A1. Then, data such as control signals is transmitted from the device control portion 59 to each part of the image forming apparatus A1.

Figure 13:
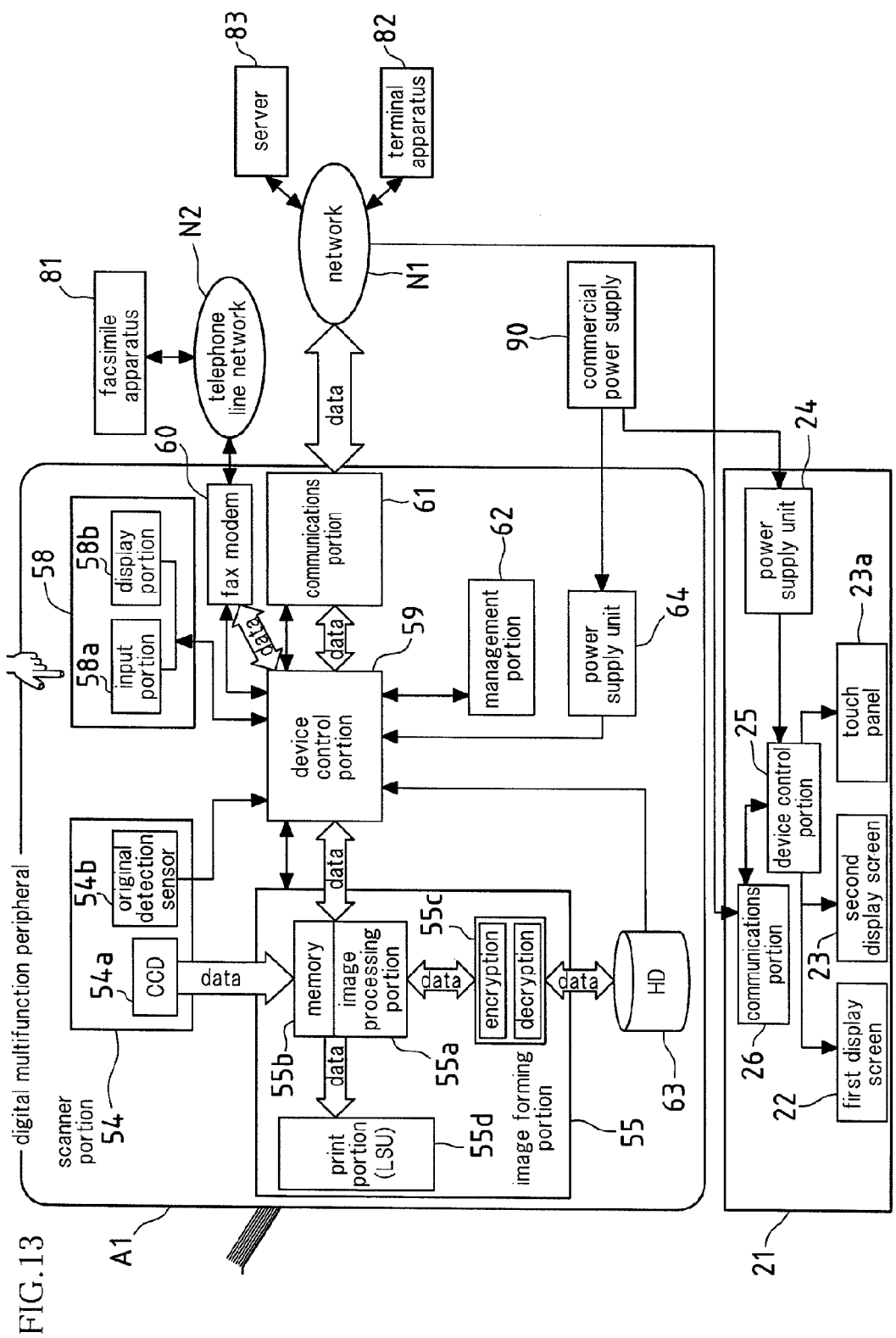
FIG. 13 is a system configuration diagram that shows the general electrical configuration of a digital multifunction peripheral (image forming apparatus) that includes a large-format display, and the connection relationship with a display information management system that manages this general electrical configuration.
Figure 14:
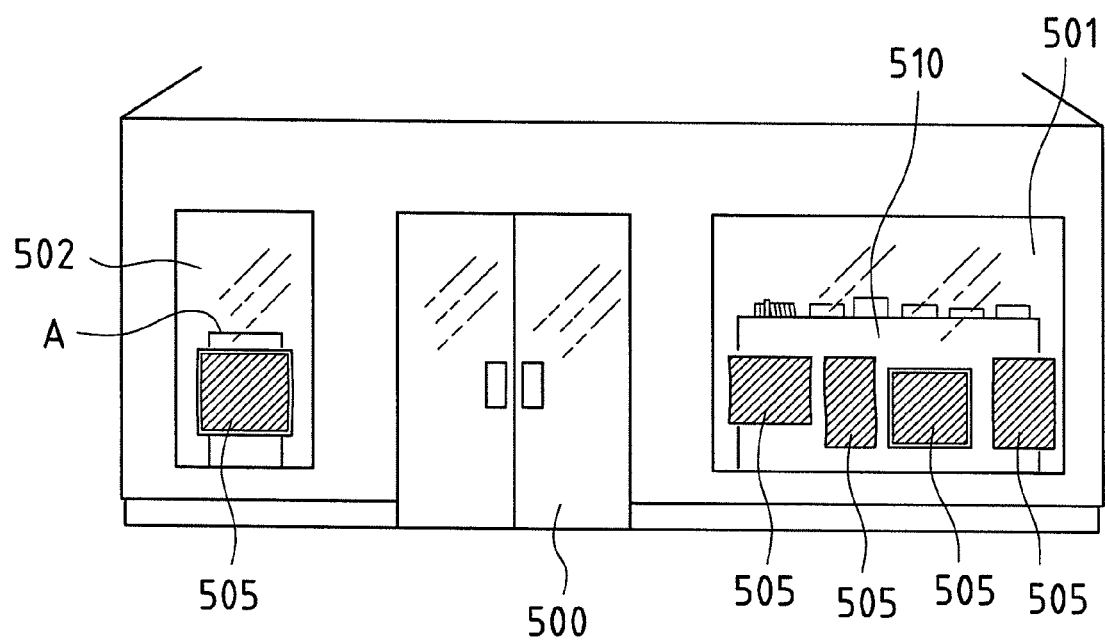
FIG. 14 illustrates an ordinary arrangement configuration of a convenience store.

The connection relationship when the image forming apparatus A1 and the large-format display 21 have been separated is as shown in FIG. 13. In other words, the connection between the device control portion 59 of the image forming apparatus A1 and the communications portion 26 of the large-format display 21 is severed. Accordingly, in this case, the data transmitted from the terminal apparatus 82 or server 83 connected to the network N1 is transmitted to the device control portion 25 via the communications portion 26 of the large-format display 21, and the device control portion 25 of the large-format display 21 performs image display of the data that has been transmitted in the first display screen 22 and the second display screen 23.

Also, power of the large-format display 21 is directly supplied to the power supply unit 24 of the large-format display 21 from the commercial power supply 90. Thus, the image forming apparatus A1 and the large-format display 21 can each operate even when the image forming apparatus A1 and the large-format display 21 are separated.

Also, a configuration may be adopted in which when the image forming apparatus A1 and the large-format display 21 have been separated, the device control portion 59 of the image forming apparatus A1 and the communications portion 26 of the large-format display 21 are not directly connected, but are connected via the network N1.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image forming apparatus having a connecting structure to a display apparatus,
    the image forming apparatus comprising an original reading portion, an image forming portion, an operation portion, and a first case,
    the image forming portion performing a printing operation according to an operation directed toward the operation portion;
    the display apparatus has a display screen on a rear face or a side face viewed from an operation side of the image forming apparatus being disposed and formed such that the display apparatus and the image forming apparatus are connectable and separable, the display apparatus comprising a second case,
    wherein, in the first case of the image forming apparatus, first power connector portions that supply power to the display apparatus or receive power from the display apparatus, first signal connector portions that send control signals or display data to the display apparatus or receive print data from the display apparatus are provided, and first connecting portions for connecting the display apparatus are provided,
    wherein, in the second case of the display apparatus, second power connector portions that receive power from the image forming apparatus or supply power to the image forming apparatus, second signal connector portions that receive control signals or display data from the image forming apparatus or sends print data to the image forming apparatus, and second connecting portions for connecting to the image forming apparatus are provided,
    wherein, upon connecting the first connecting portions of the image forming apparatus and the second connecting portions of the display apparatus, the first and second power connector portions are also simultaneously connected to each other, and the first and second signal connector portions are also simultaneously connected to each other, and wherein said first connecting portions includes a pair of left and right fixing members formed in the first case of the image forming apparatus, the fixing members including a flat body portion that protrudes from the first case of the image forming apparatus, a tapered portion formed at an end of the body portion, and a through-hole formed in a base portion of the body portion, and the second connecting portions includes an opening portion where the fixing members are inserted and a fixing catch for latching by insertion into the through-hole of the body portion provided in the opening portion.

2. The image forming apparatus having a connecting structure of a display apparatus according to claim 1, wherein the image forming apparatus and the display apparatus can each operate in a state in which the image forming apparatus and the display apparatus have been separated.

3. The image forming apparatus having a connecting structure of a display apparatus according to claim 2, wherein the fixing catch is fixed to a shaft that is rotatable supported by bearing portion disposed in a frame portion of the display apparatus, one end of a compression spring is fixed to the fixing catch, and an other end of the compression spring is fixed to a spring receptacle provided in the frame portion.

4. The image forming apparatus having a connecting structure of a display apparatus according to claim 1, wherein the display apparatus is provided with a support leg.

5. The image forming apparatus having a connecting structure of a display apparatus according to claim 4, wherein one end of the shaft protrudes outward from the second case of the display apparatus, and a release lever for rotating the shaft together with the fixing catch is provided at an end portion of the protruding shaft.

6. The image forming apparatus having a connecting structure of a display apparatus according to claim 4, wherein in a state in which the display apparatus and the image forming apparatus have been connected, the support leg of the display apparatus is stored under the image forming apparatus.

7. The image forming apparatus having a connecting structure of a display apparatus according to claim 6, wherein the lateral width of the support leg of the display apparatus is no more than the lateral width of the image forming apparatus.

8. The image forming apparatus having a connecting structure of a display apparatus according to claim 6, wherein the lateral width of the support leg of the display apparatus is no more than the depth-wise width of the image forming apparatus.

9. The image forming apparatus having a connecting structure of a display apparatus according to claim 6, wherein in a state in which the support leg of the display apparatus has been stored under the image forming apparatus, the end of the support leg does not protrude from the front face or a side face of the image forming apparatus.

10. The image forming apparatus having a connecting structure of a display apparatus according to claim 6, wherein a pair of support legs of the display apparatus are provided so as to have a predetermined space between the support legs.

11. The image forming apparatus having a connecting structure of a display apparatus according to claim 10, wherein the space between the support legs of the display apparatus is no more than the lateral width of the image forming apparatus.

12. The image forming apparatus having a connecting structure of a display apparatus according to claim 10, wherein the space between the support legs of the display apparatus is no more than the depth-wise width of the image forming apparatus.

13. The image forming apparatus having a connecting structure of a display apparatus according to claim 1, wherein the display apparatus comprises a pair of support legs provided so as to have a predetermined space between the support legs, and in a state in which the display apparatus and the image forming apparatus have been connected, the image forming apparatus is stored between the support legs of the display apparatus.

14. The image forming apparatus having a connecting structure of a display apparatus according to claim 13, wherein the space between the support legs of the display apparatus is no less than the lateral width of the image forming apparatus.

15. The image forming apparatus having a connecting structure of a display apparatus according to claim 13, wherein the space between the support legs of the display apparatus is no less than the depth-wise width of the image forming apparatus.

16. The image forming apparatus having a connecting structure of a display apparatus according to claim 13, wherein in a state in which the image forming apparatus has been stored between the support legs of the the display apparatus, the end of the support legs does not protrude from the front face or a side face of the image forming apparatus.

* * * * *